(No Model.)
L. GODDU.
CLUTCH.
No. 402,014. Patented Apr. 23, 1889.
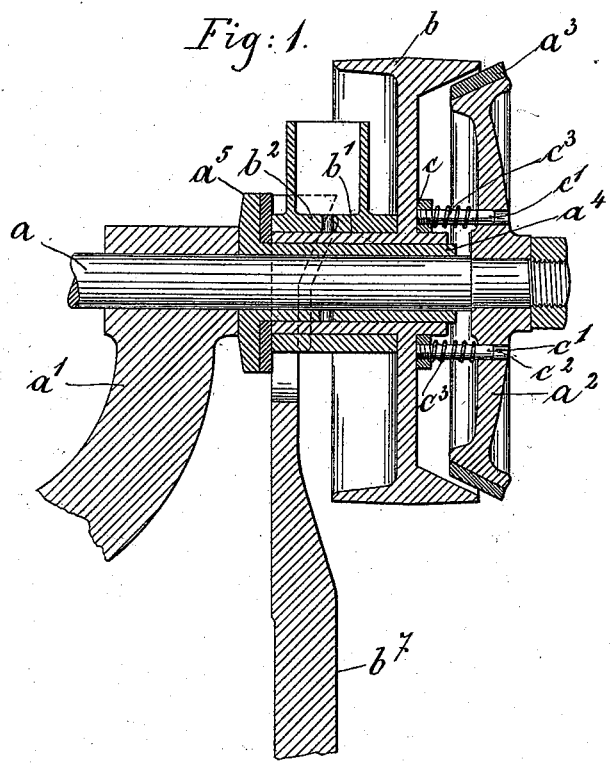
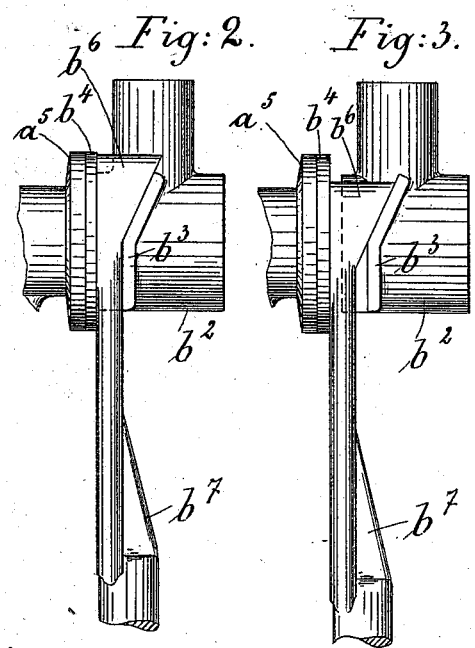
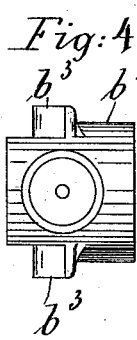
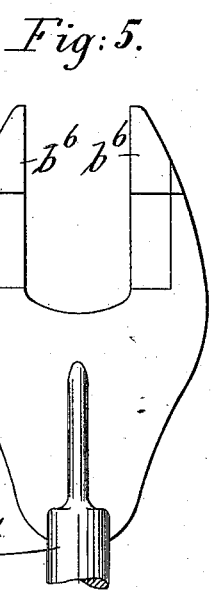
Witnesses.
Inventor.
Louis Goddu

UNITED STATES PATENT OFFICE.

LOUIS GODDU, OF WINCHESTER, ASSIGNOR TO JAMES W. BROOKS, PRINCIPAL TRUSTEE, OF CAMBRIDGE, AND FRANK F. STANLEY, ASSOCIATE TRUSTEE, OF SWAMPSCOTT, MASSACHUSETTS.

CLUTCH.

SPECIFICATION forming part of Letters Patent No. 402,014, dated April 23, 1889.

Application filed July 9, 1888. Serial No. 279,423. (No model.)

*To all whom it may concern:*

Be it known that I, LOUIS GODDU, of Winchester, county of Middlesex, State of Massachusetts, have invented an Improvement in Clutches, of which the following description, in connection with the accompanying drawings, is a specification, like letters on the drawings representing like parts.

This invention relates to clutch mechanism of that class in which a loose pulley is moved longitudinally on a shaft, and has for its object to improve the construction of the same, whereby the wear upon the pulley and shaft is largely obviated.

In accordance with my invention the loose pulley is mounted on a sleeve free to rotate on the shaft, the said sleeve being provided with a collar or flange, and preferably with a washer, which abuts against the said collar or flange, and against which the shipper lever or rod bears when the said lever or rod (herein shown as wedge-shaped) is acted upon to move the loose pulley on the sleeve.

My invention therefore consists, essentially, in a shaft and a friction-disk thereon, combined with a free or disconnected sleeve loose on said shaft and capable of a longitudinal and rotary movement thereon, a pulley loose on said sleeve, and means to move the pulley longitudinally on the sleeve, substantially as and for the purpose specified.

Figure 1 is a vertical section of a clutch mechanism embodying my invention; Fig. 2, an elevation of the wedge lever or rod and its co-operating hub, showing the wedge-lever disengaged from the hub; Fig. 3, an elevation of the wedge-lever and hub, with the wedge in engagement with the hub; Figs. 4 and 5, details to be referred to.

The shaft $a$, supported in a frame, $a'$, has firmly secured to it a friction-disk, $a^2$, provided, as shown, with a friction-surface, $a^3$, preferably of leather.

The shaft $a$ has loosely mounted on it a sleeve, $a^4$, provided with a collar or flange, $a^5$, the said sleeve being free and disconnected and capable of longitudinal and rotary movement on the shaft. The sleeve $a^4$ has loosely mounted on it a pulley, $b$, having its hub $b'$ made, as herein shown, of substantially the same length as the said sleeve, the said hub having mounted on it a collar or hub, $b^2$, provided with flanges $b^3$ on its opposite sides, the said flanges being made inclined for a portion of their length, to form, with a washer, $b^4$, on the sleeve $a^4$, (but which may be the flange $a^5$,) a wedge-shaped opening, into which the wedge-shaped forks $b^6$ of a shipper-rod, $b^7$, are adapted to be drawn or moved when it is desired to bring the periphery or rim of the loose pulley into engagement with the friction-surface of the disk $a^2$ to impart rotation to the shaft, the loose pulley being driven in usual manner by a belt. (Not shown.) The hub of the pulley near the disk $a^2$ has loosely mounted on it a collar, $c$, having secured to it, as herein shown, rods $c'$, adapted to enter holes $c^2$ in the said disk, the said rods being encircled by springs $c^3$, which act to disengage the pulley from the disk $a^2$ when the pressure upon the hub $b^3$ and pulley $b$ is withdrawn—that is, when the wedge-shaped shipper-rod $b^7$ is in the position shown in Figs. 1 and 2. With the parts in the position shown in Fig. 1, the pulley is free to run on the sleeve $a^4$ without imparting rotation to the shaft.

To rotate the shaft, the shipper-rod is drawn or moved from the position shown in Fig. 2 to that shown in Fig. 3, the wedge-forks acting on the inclined part of the flanges and against the washer to move the pulley longitudinally over the sleeve into engagement with the friction-disk. When the pulley is disengaged from the friction-disk, it is free to run on the sleeve and the latter free to run on the shaft, thereby diminishing the wear on the pulley and shaft, the wear falling principally on the sleeve, which may be easily replaced by another when worn.

I claim—

1. A shaft and a friction-disk thereon, combined with a free and disconnected sleeve loose on said shaft and capable of longitudinal and rotary movement on said shaft, a pulley loose on said sleeve, and means to move the pulley longitudinally on the sleeve, substantially as and for the purpose specified.

2. A shaft and a friction-disk thereon, combined with a free and disconnected sleeve provided with a flange, and loose on said shaft, a pulley loose on said sleeve, a hub, $b^2$, and a shipper-rod acting on said hub to move the said pulley, substantially as described.

In testimony whereof I have signed my name to this specification in the presence of two subscribing witnesses.

LOUIS GODDU.

Witnesses:
G. W. GREGORY,
JAS. H. CHURCHILL.